(12) United States Patent
Lee et al.

(10) Patent No.: US 12,224,454 B2
(45) Date of Patent: Feb. 11, 2025

(54) BATTERY MODULE, BATTERY PACK COMPRISING SAME BATTERY MODULE, AND VEHICLE COMPRISING SAME BATTERY PACK

(71) Applicant: LG Chem, Ltd., Seoul (KR)

(72) Inventors: Young-Ho Lee, Daejeon (KR); Jung-Min Kwak, Daejeon (KR); Do-Hyun Park, Daejeon (KR); Jae-Hyun You, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1169 days.

(21) Appl. No.: 17/044,580

(22) PCT Filed: Dec. 19, 2019

(86) PCT No.: PCT/KR2019/018142
§ 371 (c)(1),
(2) Date: Oct. 1, 2020

(87) PCT Pub. No.: WO2020/138848
PCT Pub. Date: Jul. 2, 2020

(65) Prior Publication Data
US 2021/0203041 A1    Jul. 1, 2021

(30) Foreign Application Priority Data
Dec. 26, 2018 (KR) .......................... 10-2018-0169947

(51) Int. Cl.
*H01M 50/50* (2021.01)
*B23K 37/04* (2006.01)
(Continued)

(52) U.S. Cl.
CPC ....... *H01M 50/505* (2021.01); *B23K 37/0443* (2013.01); *B60L 50/64* (2019.02);
(Continued)

(58) Field of Classification Search
CPC ............. H01M 50/249; H01M 50/505; H01M 50/507; H01M 50/516; B23K 37/0443
See application file for complete search history.

(56) References Cited

U.S. PATENT DOCUMENTS 9,029,000 B2    5/2015  Han et al.
2006/0214631 A1  9/2006  Yoon et al.
(Continued)

FOREIGN PATENT DOCUMENTS

CN    103534834 A    1/2014
CN    103608946 A    2/2014
(Continued)

OTHER PUBLICATIONS

English WO 2018183760 (Year: 2018).*
(Continued)

*Primary Examiner* — Ula C Ruddock
*Assistant Examiner* — Frank A Chernow
(74) *Attorney, Agent, or Firm* — Lerner David LLP

(57) ABSTRACT

A battery module according to an embodiment of the present disclosure includes a plurality of battery cells, a busbar frame assembly supporting the plurality of battery cells and including a plurality of busbars electrically connected to electrode leads of the plurality of battery cells, and a plurality of fixing jig holes provided in top and bottom surfaces of the busbar frame assembly, and into which welding jigs for fixing the busbar frame assembly are configured to be inserted in a welding process for electrically connecting the electrode leads of the plurality of battery cells to the plurality of busbars.

11 Claims, 10 Drawing Sheets

(51) Int. Cl.
- *B60L 50/64* (2019.01)
- *H01M 50/20* (2021.01)
- *H01M 50/209* (2021.01)
- *H01M 50/211* (2021.01)
- *H01M 50/249* (2021.01)
- *H01M 50/505* (2021.01)
- *H01M 50/516* (2021.01)
- *H01M 50/531* (2021.01)
- *H01M 50/548* (2021.01)
- *H01M 50/284* (2021.01)
- *H01M 50/569* (2021.01)

(52) U.S. Cl.
CPC ....... *H01M 50/209* (2021.01); *H01M 50/211* (2021.01); *H01M 50/249* (2021.01); *H01M 50/50* (2021.01); *H01M 50/516* (2021.01); *H01M 50/531* (2021.01); *H01M 50/548* (2021.01); *H01M 50/284* (2021.01); *H01M 50/569* (2021.01); *H01M 2220/20* (2013.01)

(56) References Cited

U.S. PATENT DOCUMENTS

| | | |
|---|---|---|
| 2014/0045038 A1 | 2/2014 | Kimura et al. |
| 2014/0087221 A1 | 3/2014 | Kim et al. |
| 2015/0136438 A1 | 5/2015 | Lumetta |
| 2016/0268656 A1 | 9/2016 | Park |
| 2017/0309876 A1 | 10/2017 | An et al. |
| 2018/0076487 A1 | 3/2018 | Lee et al. |
| 2018/0212215 A1 | 7/2018 | Park et al. |
| 2018/0301667 A1 | 10/2018 | Nakai et al. |
| 2018/0358592 A1 | 12/2018 | Park et al. |
| 2019/0321945 A1 | 10/2019 | Jung et al. |
| 2019/0348720 A1 | 11/2019 | Oh et al. |
| 2019/0389318 A1 | 12/2019 | Lee et al. |
| 2020/0014005 A1 | 1/2020 | Lee et al. |

FOREIGN PATENT DOCUMENTS

| | | |
|---|---|---|
| CN | 104659628 A | 5/2015 |
| CN | 107925030 A | 4/2018 |
| CN | 108140790 A | 6/2018 |
| CN | 108886121 A | 11/2018 |
| EP | 2706589 A2 | 3/2014 |
| EP | 3367470 A1 | 8/2018 |
| JP | 2008091233 A | 4/2008 |
| JP | 2013229266 A | 11/2013 |
| JP | 2014525114 A | 9/2014 |
| JP | 2018522376 A | 8/2018 |
| JP | 2018530888 A | 10/2018 |
| KR | 100891079 B1 | 3/2009 |
| KR | 20130133855 A | 12/2013 |
| KR | 101459400 B1 | 11/2014 |
| KR | 20150057363 A | 5/2015 |
| KR | 20160109155 A | 9/2016 |
| KR | 20160111217 A | 9/2016 |
| KR | 101697698 B1 | 1/2017 |
| KR | 20180099437 A | 9/2018 |
| WO | 2012147134 A1 | 11/2012 |
| WO | 2018124494 A2 | 7/2018 |
| WO | 2018124751 A1 | 7/2018 |
| WO | 2018131843 A1 | 7/2018 |

OTHER PUBLICATIONS

Examination Report from the Office Action for Indian Application No. 202117017388 issued Sep. 5, 2022, 2 pages.
European Search Report for Application No. 19905047.7 dated Jun. 24, 2021. 2 pgs.
Search report from International Application No. PCT/KR2019/018142, mailed Apr. 3, 2020.
Search Report dated Jun. 7, 2022 from the Office Action for Chinese Application No. 201980025026.2 issued Jun. 15, 2022, pp. 1-3.

* cited by examiner

BATTERY MODULE, BATTERY PACK COMPRISING SAME BATTERY MODULE, AND VEHICLE COMPRISING SAME BATTERY PACK

CROSS-REFERENCE TO RELATED APPLICATIONS

The present application is a national phase entry under 35 U.S.C. § 371 of International Application No. PCT/KR2019/018142, filed Dec. 19, 2019, which claims priority from Korean Patent Application No. 10-2018-0169947 filed on Dec. 26, 2018, the disclosures of which are incorporated herein by reference.

TECHNICAL FIELD

The present disclosure relates to a battery module, a battery pack including the battery module, and a vehicle including the battery pack.

BACKGROUND ART

Due to high applicability to various products and excellent electrical properties such as high energy density, secondary batteries are being broadly used not only in portable devices but also in electric vehicles (EVs) or hybrid electric vehicles (HEVs) driven by electrical power sources. The secondary batteries are attracting attention as a new energy source for increasing environment friendliness and energy efficiency because they may significantly reduce the use of fossil fuels and do not generate any by-products of energy consumption.

Currently popular secondary batteries include lithium ion batteries, lithium polymer batteries, nickel cadmium batteries, nickel hydrogen batteries, nickel zinc batteries, etc. Such a unit secondary battery cell, i.e., a unit battery cell, has an operating voltage of about 2.5 V to 4.5 V. Therefore, when a higher output voltage is required, a plurality of battery cells may be connected in series to configure a battery pack. Based on a charge/discharge capacity required for a battery pack, a plurality of battery cells may be connected in parallel to configure the battery pack. As such, the number of battery cells included in a battery pack may be variously set depending on a required output voltage or charge/discharge capacity.

To configure a battery pack by connecting a plurality of battery cells in series or in parallel, generally, a battery module including at least one battery cell is configured first and then a battery pack is configured by adding other components to at least one battery module.

In an assembly process of a conventional battery module, electrode leads of battery cells are welded to busbars of a busbar frame assembly to achieve electrical connection therebetween. When the busbar frame assembly moves, for example, shakes, in the welding process, the accuracy and quality of welding may be reduced and problems such as poor connection between the electrode leads and the busbars may occur.

Therefore, a method capable of preventing motion of a busbar frame assembly in a welding process between electrode leads of battery cells and busbars of the busbar frame assembly is required.

DISCLOSURE

Technical Problem

The present disclosure is directed to providing a battery module capable of preventing motion of a busbar frame assembly in a welding process between electrode leads of battery cells and busbars of the busbar frame assembly, a battery pack including the battery module, and a vehicle including the battery pack.

Technical Solution

In one aspect of the present disclosure, there is provided a battery module including a plurality of battery cells, a busbar frame assembly supporting the plurality of battery cells and including a plurality of busbars electrically connected to electrode leads of the plurality of battery cells, and a plurality of fixing jig holes provided in top and bottom surfaces of the busbar frame assembly, and into which welding jigs for fixing the busbar frame assembly are configured to be inserted in a welding process for electrically connecting the electrode leads of the plurality of battery cells to the plurality of busbars.

The plurality of fixing jig holes may include base jig holes provided in the bottom surface of the busbar frame assembly, and into which the welding jigs are configured to be inserted in the welding process, and top jig holes provided in the top surface of the busbar frame assembly, and into which the welding jigs are configured to be inserted in the welding process.

The base jig holes may include edge jig holes provided at bottom edges of the busbar frame assembly, and auxiliary jig holes provided between the edge jig holes and spaced apart from each other by a predetermined distance along a width direction of the busbar frame assembly.

The top jig holes may include edge jig holes provided at top edges of the busbar frame assembly.

The busbar frame assembly may include front and rear frames including the plurality of busbars, and a top frame configured to connect the front frame to the rear frame, and the plurality of fixing jig holes may be provided in top and bottom surfaces of the front and rear frames.

The front and rear frames may be rotatably hinge-coupled to the top frame.

The top frame may include a plurality of anti-interference grooves configured to prevent interference with the plurality of fixing jig holes when the front and rear frames are hinge-coupled to the top frame.

The plurality of anti-interference grooves may be provided at four side regions of the top frame.

In another aspect of the present disclosure, there is provided a battery pack including at least one battery module according to the afore-described embodiments, and a pack case configured to package the at least one battery module.

In another aspect of the present disclosure, there is provided a vehicle including the battery pack according to the afore-described embodiments.

Advantageous Effects

According to the afore-described various embodiments, a battery module capable of preventing motion of a busbar frame assembly in a welding process between electrode leads of battery cells and busbars of the busbar frame assembly, a battery pack including the battery module, and a vehicle including the battery pack may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

The present disclosure will become more apparent by describing in detail embodiments thereof with reference to the attached drawings. It should be understood that the embodiments described herein are only illustrative for better understanding of the present disclosure and may be modified in various ways. In addition, for ease of understanding of the present disclosure, the accompanying drawings are not illustrated in a real scale and the dimensions of some components may be exaggerated.

Figure 1:
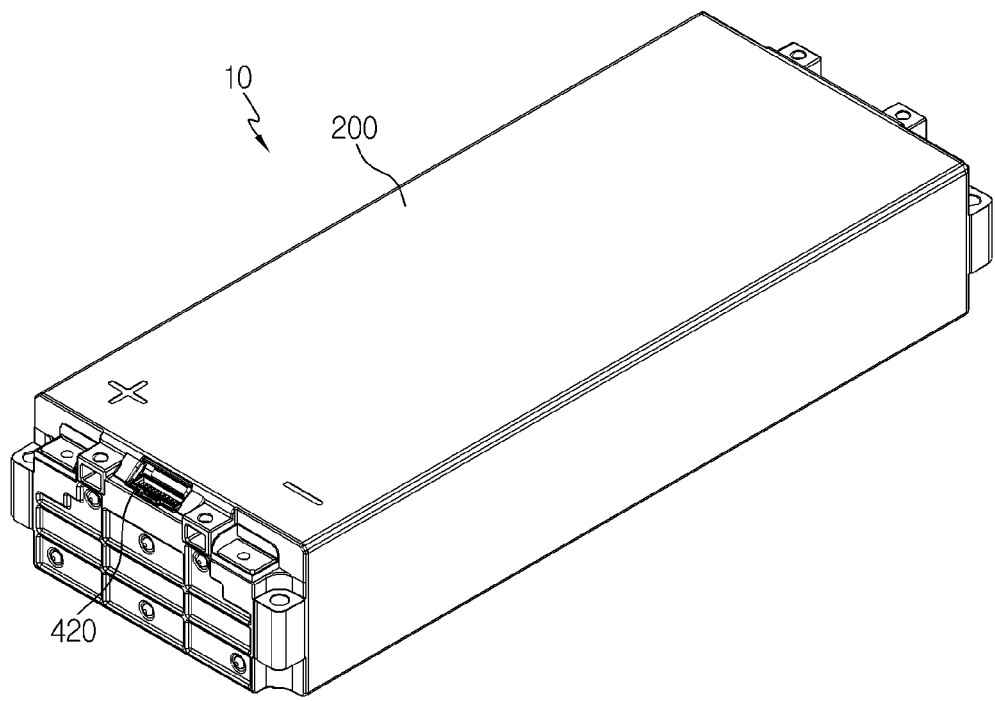
FIG. 1 is a view for describing a battery module according to an embodiment of the present disclosure.
Figure 2:
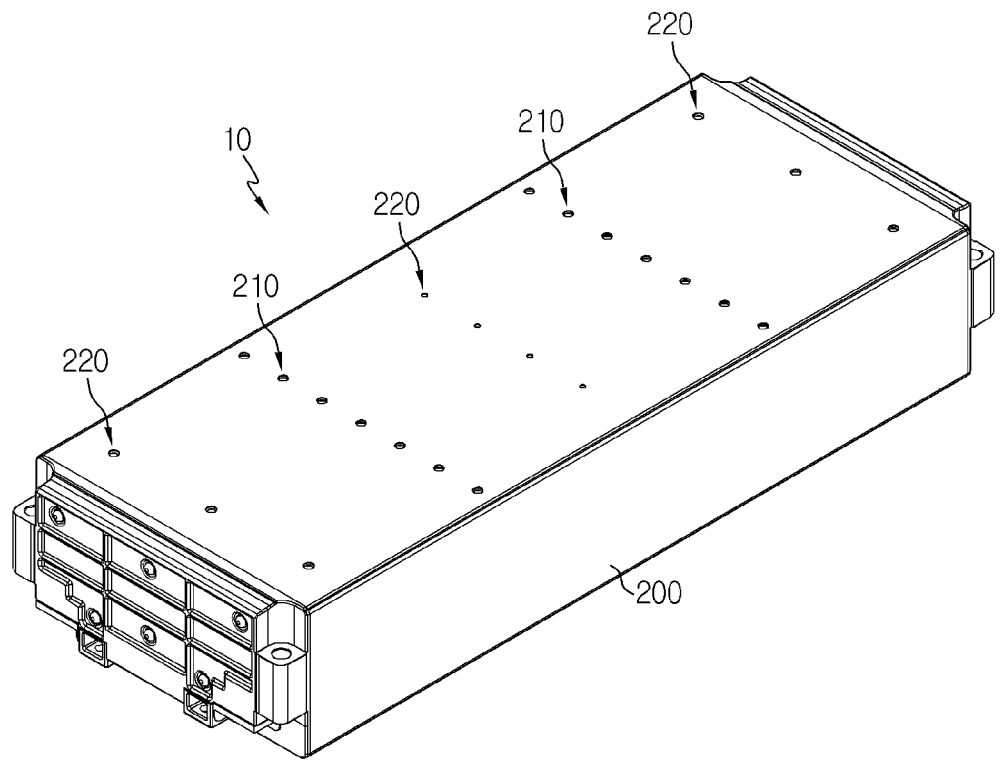
FIG. 2 is a bottom perspective view of the battery module of FIG. 1.
Figure 3:
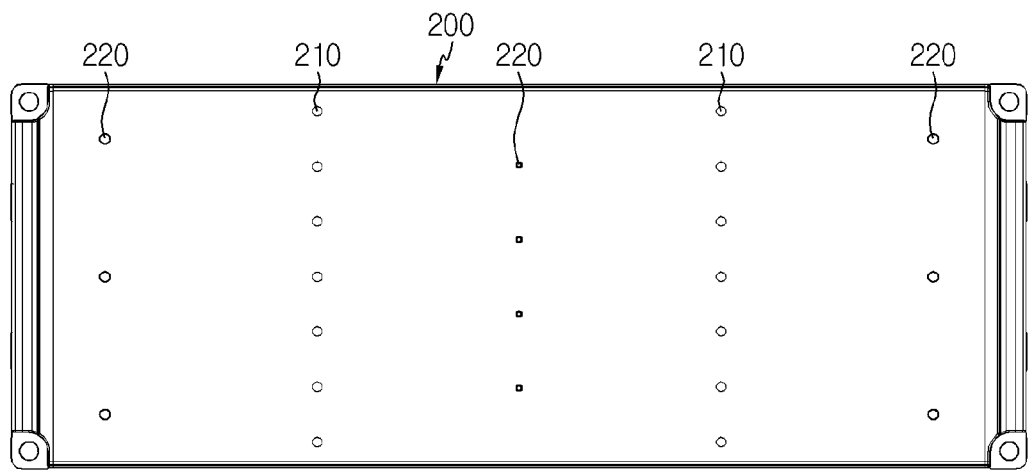
FIG. 3 is a bottom view of the battery module of FIG. 2.
Figure 4:
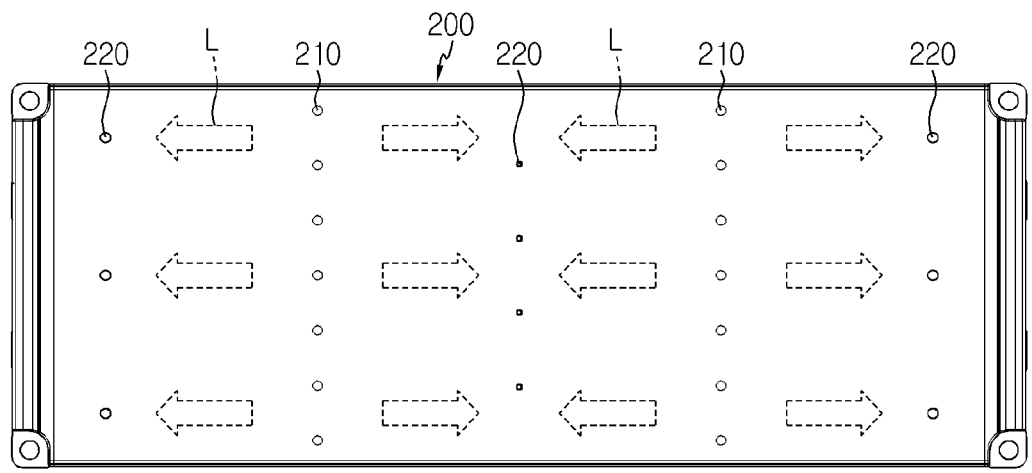
FIG. 4 is a view for describing a resin injection process of the battery module of FIG. 1.
Figure 5:
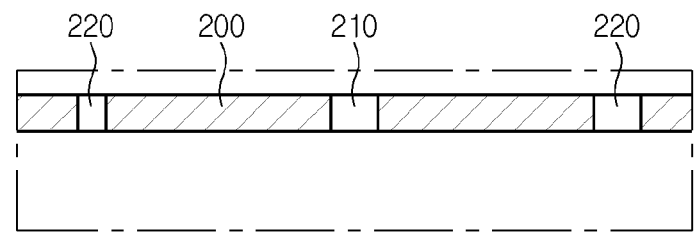
FIGS. 5 and 6 are views for describing shapes of resin injection holes according to various embodiments of the battery module of FIG. 4.
Figure 6:
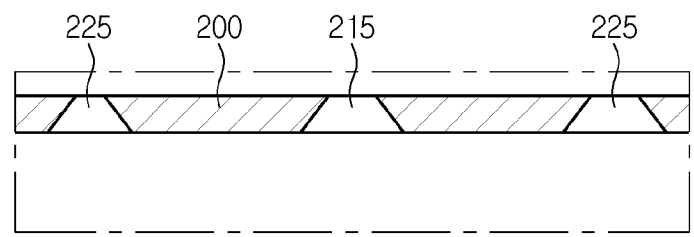
Figure 7:
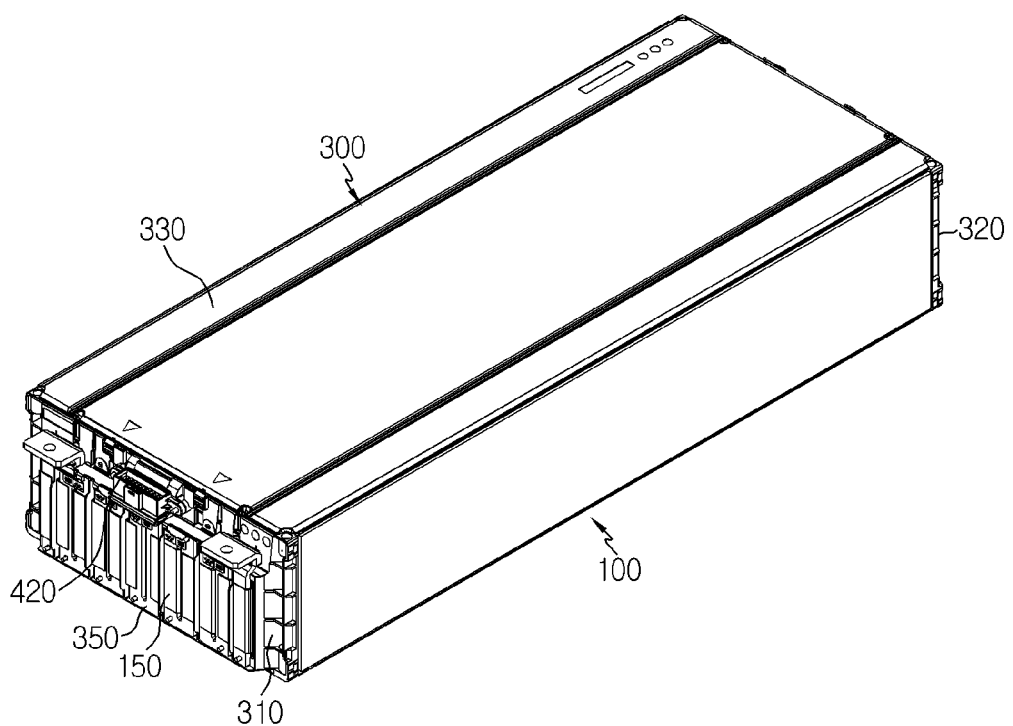
FIG. 7 is a view illustrating the battery module of FIG. 1 without a module case.
Figure 8:
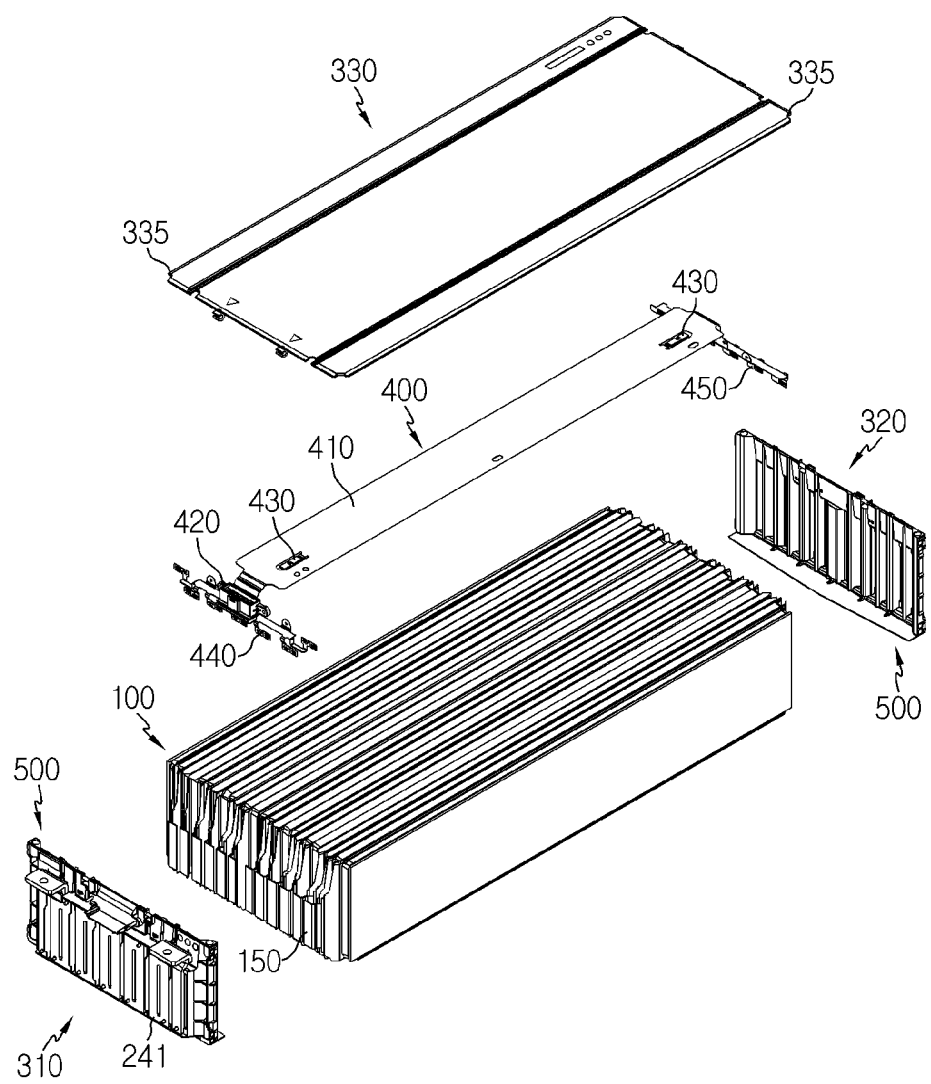
FIG. 8 is an exploded perspective view of the battery module of FIG. 7.
Figure 9:
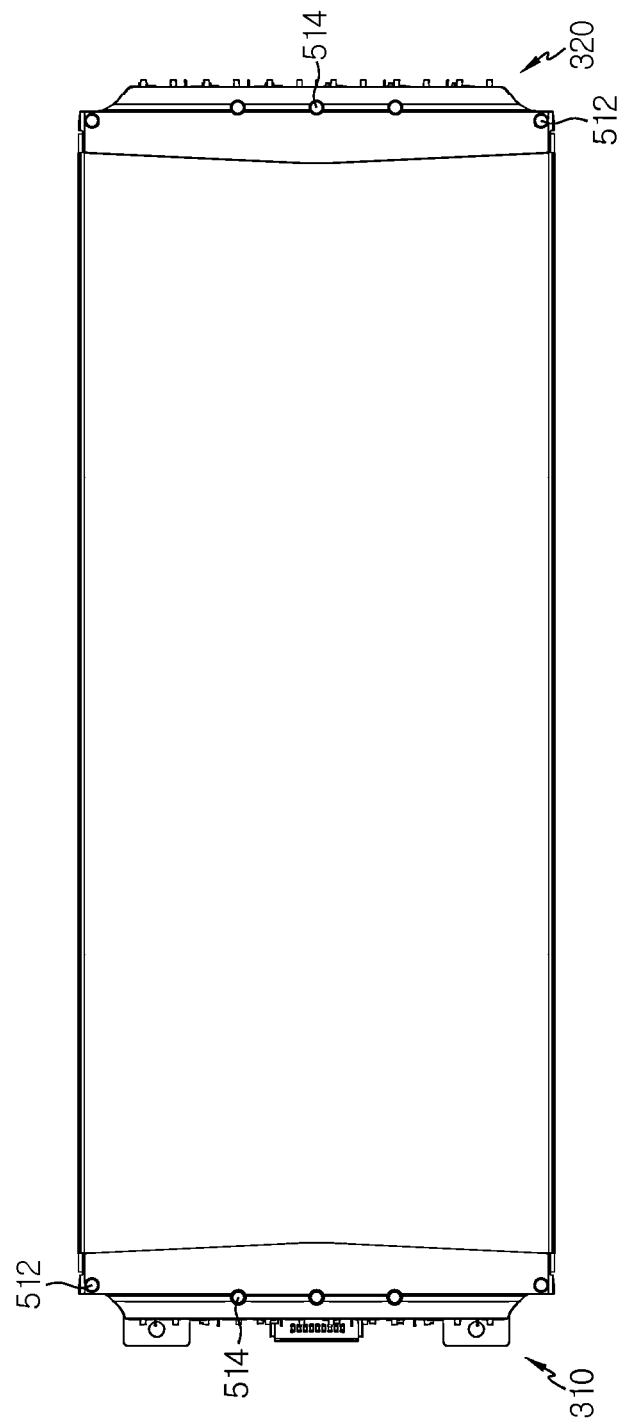
FIG. 9 is a bottom view of the battery module of FIG. 7.
Figure 10:
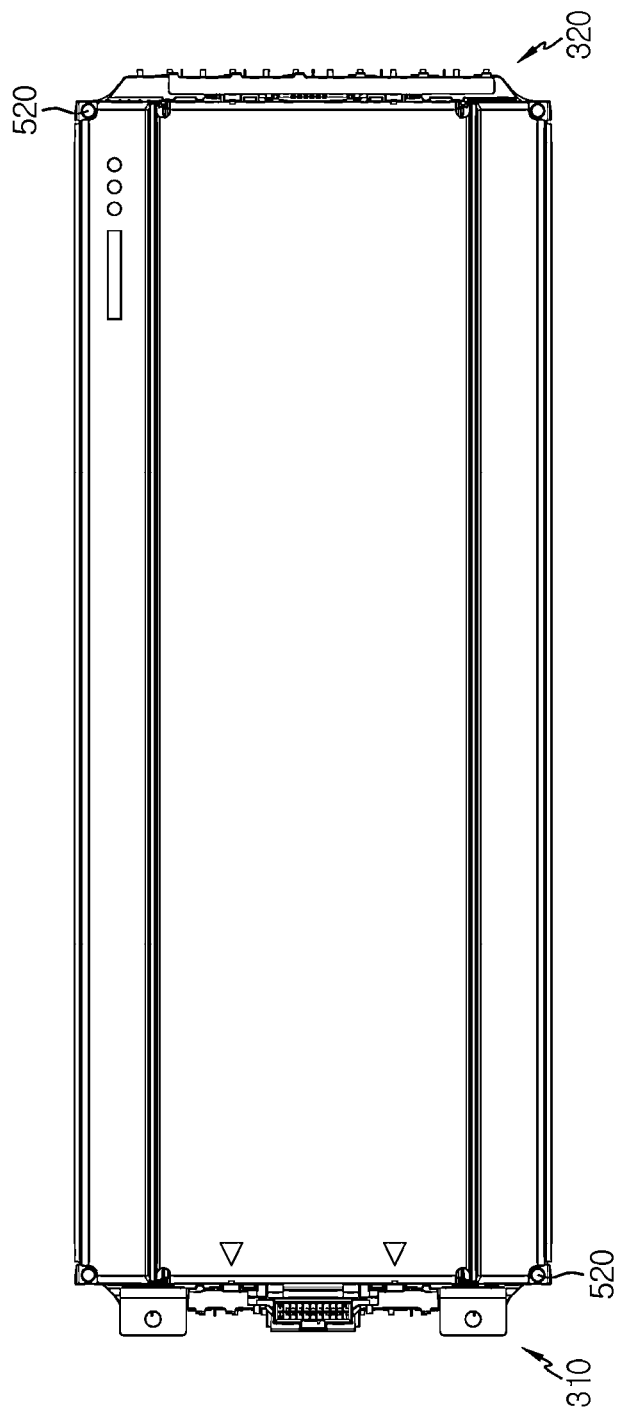
FIG. 10 is a plan view of the battery module of FIG. 7.
Figure 11:
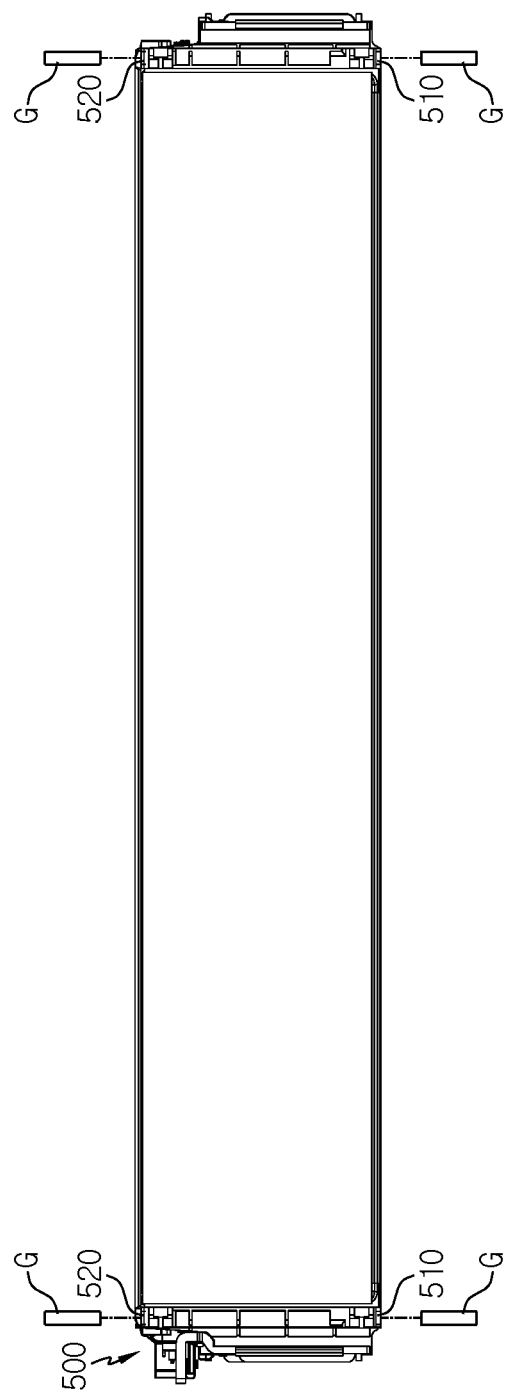
FIG. 11 is a view for describing a fixing process to weld electrode leads of the battery module of FIG. 7.

FIG. 1 is a view for describing a battery module 10 according to an embodiment of the present disclosure, FIG. 2 is a bottom perspective view of the battery module 10 of FIG. 1, FIG. 3 is a bottom view of the battery module 10 of FIG. 2, FIG. 4 is a view for describing a resin injection process of the battery module 10 of FIG. 1, FIGS. 5 and 6 are views for describing shapes of resin injection holes according to various embodiments of the battery module 10 of FIG. 4, FIG. 7 is a view illustrating the battery module 10 of FIG. 1 without a module case, FIG. 8 is an exploded perspective view of the battery module 10 of FIG. 7, FIG. 9 is a bottom view of the battery module 10 of FIG. 7, FIG. 10 is a plan view of the battery module 10 of FIG. 7, and FIG. 11 is a view for describing a fixing process to weld electrode leads of the battery module 10 of FIG. 7.

Referring to FIGS. 1 to 11, the battery module 10 may include battery cells 100, a module case 200, a busbar frame assembly 300, a voltage sensing unit 400, and a plurality of fixing jig holes 500.

The battery cells 100 may be secondary batteries and be provided as pouch-type secondary batteries. Each pouch-type secondary battery may include an electrode assembly, an electrolyte, and an external pouch. The external pouch may include two pouches, and at least one of the two may have a recessed internal space. The electrode assembly and the electrolyte may be accommodated in the internal space of the external pouch. Sealing portions may be provided on outer circumferential surfaces of the two pouches and be fused together to seal the internal space accommodating the electrode assembly.

A plurality of battery cells 100 may be provided. The plurality of battery cells 100 may be stacked on one another to be electrically connected to each other. Each of the plurality of battery cells 100 is a long cell having a length greater than a width thereof compared to conventional battery cells. For example, the length of the long cell may be about 3 to 5 times greater than the width thereof. The battery module 10 according to the present disclosure employs the long-cell-type battery cells 100 in order to easily mount the battery module 10 under, for example, the seats or trunk of a vehicle by reducing the height and increasing the capacity of the battery module 10. However, the scope of the present disclosure is not limited thereto.

Each of the plurality of battery cells 100 may include a pair of electrode leads 150 respectively protruding in front and rear directions of the battery module 10.

The pair of electrode leads 150 are located at a side from a width-direction centerline of the battery cell 100 and at a lower side along a height direction of the battery module 10.

The pair of electrode leads 150 are located at a side from a width-direction centerline of the battery cell 100 as described above in order to increase an energy density of the battery module 10 by providing a space for mounting, for example, a connector member 420 to be described below.

The module case 200 may accommodate the plurality of battery cells 100 and form the exterior of the battery module 10. In this regard, the module case 200 may have a predetermined-sized space capable of accommodating the battery cells 100.

The module case 200 is provided in a rectangular tube shape. The space in the module case 200 has a volume capable of tightly accommodating the battery cells 100 and the busbar frame assembly 300 to be described below. The above-described module case 200 may be effective to reduce the weight and volume of the battery module 10.

One or more resin injection holes 210 through which a thermally conductive resin L is injectable are provided in a surface of the module case 200. Herein, the surface of the module case 200 may be a bottom surface corresponding to bottom surfaces of the battery cells 100.

Specifically, a plurality of resin injection holes 210 are located between a length-direction central region and both side regions of the bottom surface of the module case 200. Checking holes 220 may be further provided in the central region and the both side regions. The checking holes 220 are used to check whether the resin L has permeated to the corresponding regions. For example, the amount of the injected resin L may be controlled by stopping injection of the resin L when the resin L is observed through the checking holes 220.

The resin injection holes 210 and the checking holes 220 may have a rectangular cross-section as illustrated in FIG. 5, or have a trapezoidal cross-section as illustrated in FIG. 6 to facilitate injection of the resin L into the module case 200.

The busbar frame assembly 300 may be slidably inserted into the module case 200 to support the plurality of battery cells 100.

The busbar frame assembly 300 may include a front frame 310, a rear frame 320, a top frame 330, and a plurality of busbars 350.

The front and rear frames 310 and 320 may include the plurality of busbars 350. The top frame 330 may connect the front frame 310 to the rear frame 320.

Specifically, the front, rear, and top frames 310, 320, and 330 may cover and have sizes corresponding to a front surface, a rear surface, and a top surface of the battery cells 100, respectively.

Herein, the front and rear frames 310 and 320 are provided to be rotatable about the top frame 330 in order to facilitate assembly of the battery cells 100 and the busbar frame assembly 300.

In this regard, the front and rear frames 310 and 320 may be rotatably hinge-coupled to the top frame 330. That is, the front and rear frames 310 and 320 may be hinge-coupled to an end and the other end of the top frame 330, respectively.

The top frame 330 may include anti-interference grooves 335.

A plurality of anti-interference grooves 335 may be provided. The plurality of anti-interference grooves 335 may be provided at four side regions of the top frame 330. The plurality of anti-interference grooves 335 may prevent interference with the plurality of fixing jig holes 500 to be described below, when the front and rear frames 310 and 320 are hinge-coupled to the top frame 330.

The plurality of busbars 350 may be provided on the front and rear frames 310 and 320 and be electrically connected to the electrode leads 150 of the plurality of battery cells 100.

In this regard, the plurality of busbars 350 may be electrically connected to the electrode leads 150 of the plurality of battery cells 100 through, for example, welding.

The voltage sensing unit 400 may serve to sense, for example, voltage information of the battery cells 100 and include a flexible printed circuit board (FPCB) member 410, connector members 420, temperature sensors 430, and sensing terminals 440 and 450.

The FPCB member 410 may extend between the top frame 330 and the top surface of the battery cells 100 along a length direction of the battery cells 100. The FPCB member 410 may be configured as a flexible printed circuit board.

The connector members 420 may be electrically connected to the FPCB member 410 and transmit, for example, data obtained from the temperature sensors 430 and the sensing terminals 440 and 450, to a battery management system (BMS).

The temperature sensors 430 may be provided on the FPCB member 410 and be located near both sides of the battery cells 100. Because the battery cells 100 generally have the highest temperature near the electrode leads 150, the temperature sensors 430 may be located at the both sides of the battery cells 100.

The sensing terminals 440 and 450 may include first sensing terminals 440 respectively attached to the busbars 350 located on the front frame 310, and second sensing terminals 450 respectively attached to the busbars 350 located on the rear frame 320, and sense voltage values at the busbars 350.

The plurality of fixing jig holes 500 may be provided in top and bottom surfaces of the busbar frame assembly 300, and into which welding jigs G for fixing the busbar frame assembly 300 are inserted in a welding process for electrically connecting the electrode leads 150 of the plurality of battery cells 100 to the plurality of busbars 350.

The plurality of fixing jig holes 500 may be provided in top and bottom surfaces of the front and rear frames 310 and 320 and include base jig holes 510 and top jig holes 520.

The base jig holes 510 may be provided in the bottom surface of the busbar frame assembly 300, and into which the welding jigs G are inserted from below in the welding process.

The base jig holes 510 may include edge jig holes 512 and auxiliary jig holes 514.

The edge jig holes 512 may be provided at bottom edges of the busbar frame assembly 300. Specifically, the edge jig holes 512 may be provided at bottom edges of the front and rear frames 310 and 320 of the busbar frame assembly 300.

The auxiliary jig holes 514 may be provided between the edge jig holes 512 and be spaced apart from each other by a predetermined distance along a width direction of the busbar frame assembly 300, and more specifically, along a width direction of the front and rear frames 310 and 320 of the busbar frame assembly 300.

The top jig holes 520 may be provided in the top surface of the busbar frame assembly 300, and into which the welding jigs G are inserted from above in the welding process.

The top jig holes 520 may include edge jig holes provided at top edges of the busbar frame assembly 300. Specifically, the top jig holes 520 may be provided at top edges of the front and rear frames 310 and 320 of the busbar frame assembly 300.

In the current embodiment, through the plurality of fixing jig holes 500, the welding jigs G may be inserted into the busbar frame assembly 300 from above and below to fix the busbar frame assembly 300 in a welding process for electrically connecting the electrode leads 150 of the plurality of battery cells 100 to the plurality of busbars 350.

As such, in the current embodiment, both vertical and horizontal motions of the busbar frame assembly 300 may be effectively prevented to minimize motion, e.g., shaking, of the busbar frame assembly 300 in the welding process.

Therefore, in the current embodiment, through the plurality of fixing jig holes 500, the accuracy and quality of welding may be remarkably improved in the welding process and the quality of connection between the electrode leads 150 and the busbars 350 may also be greatly improved.

Figure 12:
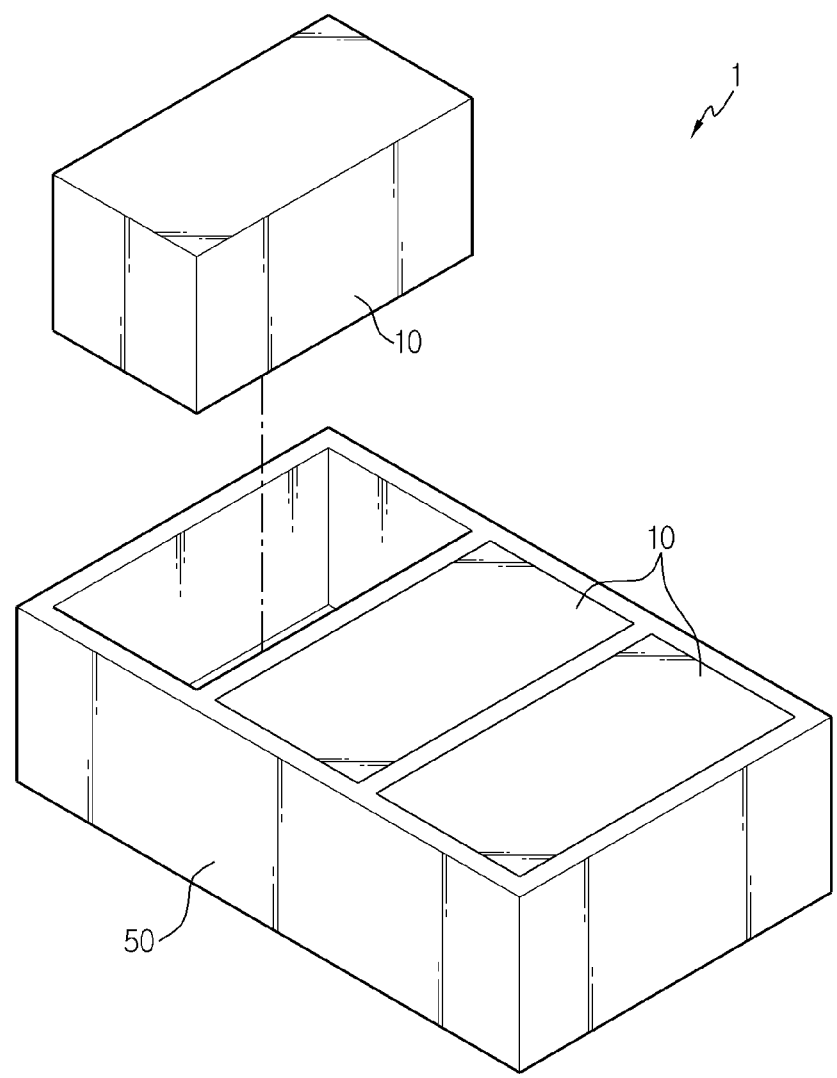
FIG. 12 is a view for describing a battery pack according to an embodiment of the present disclosure.
Figure 13:
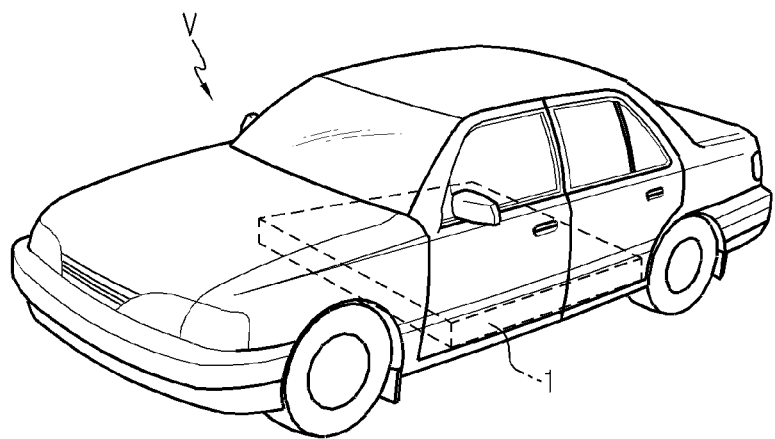
FIG. 13 is a view for describing a vehicle according to an embodiment of the present disclosure.

FIG. 12 is a view for describing a battery pack 1 according to an embodiment of the present disclosure, and FIG. 13 is a view for describing a vehicle V according to an embodiment of the present disclosure.

Referring to FIGS. 12 and 13, the battery pack 1 may include at least one battery module 10 according to the previous embodiment, and a pack case 50 configured to package the at least one battery module 10.

The battery pack 1 may be included in the vehicle V as an energy source of the vehicle V. For example, the battery pack 1 may be included in the vehicle V, e.g., an electric vehicle, a hybrid vehicle, or any other vehicle capable of using the battery pack 1 as an energy source.

In addition to the vehicle V, the battery pack 1 may also be included in any system, apparatus, or equipment using secondary batteries, e.g., an energy storage system (ESS).

Because the battery pack 1 according to the current embodiment and the system, apparatus, or equipment including the battery pack 1, e.g., the vehicle V, include the above-described battery module 10, the battery pack 1 having all advantages of the above-described battery module 10 and the system, apparatus, or equipment including the battery pack 1, e.g., the vehicle V, may be implemented.

According to the afore-described various embodiments, the battery module 10 capable of preventing motion of the busbar frame assembly 300 in a welding process between the electrode leads 150 of the battery cells 100 and the busbars 350 of the busbar frame assembly 300, the battery pack 1 including the battery module 10, and the vehicle V including the battery pack 1 may be provided.

While the present disclosure has been particularly shown and described with reference to embodiments thereof, it will be understood by one of ordinary skill in the art that various changes in form and details may be made therein without departing from the scope of the present disclosure as defined by the following claims and their equivalents.

What is claimed is:

1. A battery module comprising:
    a plurality of battery cells each having a respective first electrode lead protruding along a protruding dimension from a respective first surface of the respective battery cell of the plurality of battery cells, the plurality of battery cells being stacked along a stacking dimension such that the first surfaces of the plurality of battery cells collectively define a first plane extending along the stacking dimension;
    a busbar frame assembly supporting the plurality of battery cells and comprising a plurality of first busbars electrically connected to the first electrode leads of the plurality of battery cells, the busbar frame assembly including a planar frame extending along the first plane and having the plurality of first busbars positioned therealong; and
    a plurality of fixing jig holes provided in top and bottom surfaces of the busbar frame assembly, and into which welding jigs for fixing the busbar frame assembly are configured to be inserted in a welding process for electrically connecting the first electrode leads of the plurality of battery cells to the plurality of busbars, the plurality of fixing jig holes each having an axial dimension along which the welding jigs are configured to be inserted, the axial dimensions of the plurality of fixing jig holes being oriented along the first plane such that the axial dimensions are perpendicular to the protruding dimensions of the first electrode leads.

2. The battery module of claim 1, wherein the plurality of fixing jig holes comprise:
    base jig holes provided in the bottom surface of the busbar frame assembly, and into which the welding jigs are configured to be inserted in the welding process; and
    top jig holes provided in the top surface of the busbar frame assembly, and into which the welding jigs are configured to be inserted in the welding process.

3. The battery module of claim 2, wherein the base jig holes comprise:
    edge jig holes provided at bottom edges of the busbar frame assembly; and
    auxiliary jig holes provided between the edge jig holes and spaced apart from each other by a predetermined distance along a width direction of the busbar frame assembly.

4. The battery module of claim 2, wherein the top jig holes comprise edge jig holes provided at top edges of the busbar frame assembly.

5. The battery module of claim 1, wherein the planar frame of the busbar frame assembly is a front frame, and wherein the busbar frame assembly comprises:
    a planar rear frames having a plurality of second busbars positioned therealong, the plurality of second busbars being electrically connected to second electrode leads of the plurality of battery cells; and
    a top frame configured to connect the front frame to the rear frame, and wherein the plurality of fixing jig holes are provided in top and bottom surfaces of the front and rear frames.

6. The battery module of claim 5, wherein the front and rear frames are rotatably hinge-coupled to the top frame.

7. The battery module of claim 6, wherein the top frame comprises a plurality of anti-interference grooves configured to prevent interference with the plurality of fixing jig holes when the front and rear frames are hinge-coupled to the top frame.

8. The battery module of claim 7, wherein the plurality of anti-interference grooves are provided at four side regions of the top frame.

9. A battery pack comprising:
    at least one battery module according to claim 1; and
    a pack case configured to package the at least one battery module.

10. A vehicle comprising the battery pack according to claim 9.

11. The battery module of claim 5, wherein the second electrode leads each protrude from a respective second surface of the respective battery cell of the plurality of battery cells, the second surface of each battery cell being on an opposite side of the respective battery cell from the first surface of the respective battery cell, the second surfaces of the plurality of battery cells collectively defining a second plane extending along the stacking dimension, such that the rear frame extends along a second plane opposed to the first plane with the plurality of battery cells being positioned therebetween.

* * * * *